Aug. 11, 1931.  E. C. HEAD  1,818,554
GEAR
Filed May 16, 1928   2 Sheets-Sheet 1

INVENTOR
Ernest C. Head
ATTORNEY

Aug. 11, 1931.  E. C. HEAD  1,818,554
GEAR
Filed May 16, 1928  2 Sheets-Sheet 2

INVENTOR
Ernest C. Head
B. Schlesinger
ATTORNEY

Patented Aug. 11, 1931

1,818,554

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

GEAR

Application filed May 16, 1928. Serial No. 278,209.

The present invention relates to gears and in particular to spiral bevel gears.

The primary purpose of this invention is to provide a longitudinally curved tooth tapered gear which may be cut in a hobbing operation and which will have teeth of increased strength as compared with previous forms of hobbed tapered gears.

Other objects of the invention will be apparent hereinafter from the specification and the recital of the appended claims.

Figure 1:
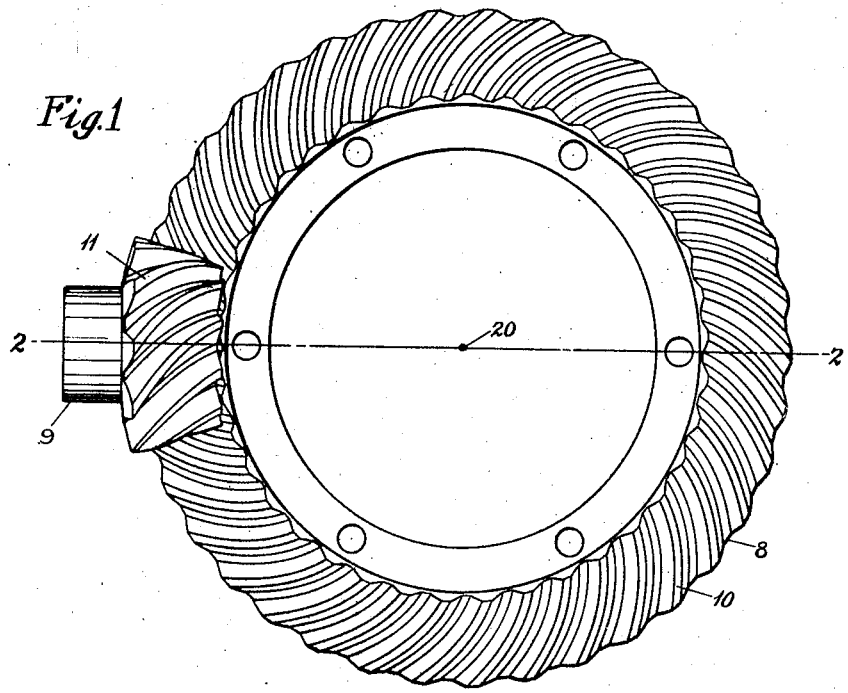
Figure 1 is a plan view of a pair of spiral bevel gears produced according to one embodiment of my invention.
Figure 2:
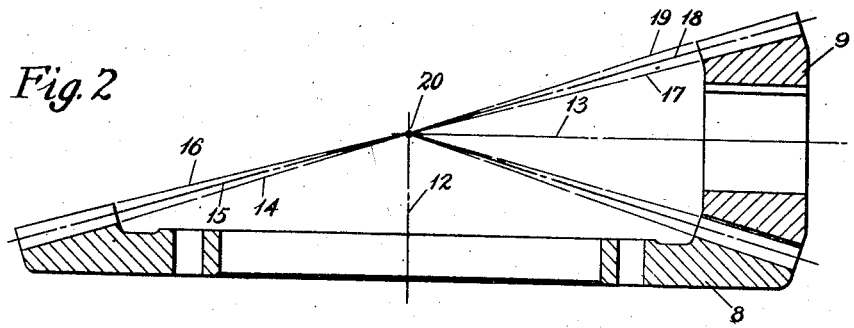
Figure 2 is a section on the line 2—2 of Figure 1.

Heretofore it has been customary in hobbing tapered gears to cut both members of a pair "parallel depth", that is, with teeth of uniform depth from end to end. Where the teeth have been cut "tapering depth" that is, of decreasing depth from their large to their small ends, this has been accomplished simply by turning off the teeth of the hob so that they decrease in height from the large end to the small end of the hob. Gears which are of "parallel depth" are weak at their inner or small ends because for one reason the teeth at the small end are of excessive height in proportion to their thickness. Where tapering depth teeth are produced simply by turning off the top surface of the hob to a different cone angle from the cone angle to the pitch surface, the teeth of the gear cut are not properly proportioned from end to end. In either case, gears hobbed according to previous practise have not been as strong or as capable of bearing heavy loads as tapered gears cut by methods other than a hobbing process.

With the present invention, however, a tooth form is produced in which the taper of the teeth in thickness from end to end is properly proportioned to their taper in depth so that the teeth are proportionately as strong at their inner ends as at their outer ends and so that a pair of gears may be provided which are stronger and more capable of bearing heavy loads than hobbed gears of any previous construction.

Gears hobbed according to the present invention have teeth which measured circumferentially of the gears are of substantially uniform pressure angle from end to end, the pressure angles measured normally of the teeth varying along any line normal to the tooth surfaces. These features are in contrast with taper gears hobbed according to the usual practise in which the teeth are of constant or uniform normal pressure angle and of varying pressure angle from end to end measured circumferentially of the gears. In gears hobbed parallel depth, the pressure angle measured circumferentially of the gears often varies from the large to the small end of the tooth as much as six or eight degrees, decreasing toward the small ends of the teeth. The small ends of the teeth are therefore thinner than the large ends and there is also a tendency toward undercut or decreased tooth thickness below the base circle of the gear, both of which factors cause the teeth to be weak at their small ends. By keeping the circumferential pressure angle substantially constant, however, the teeth at the small end are proportionately as strong as at the large ends, that is the tooth strength at all points along its length is proportionate to its natural taper and gears of greater strength than heretofore could be hobbed are secured.

The features of the present invention are illustrated more particularly in the accompanying drawings. 8 designates the gear or larger member of a pair of spiral bevel gears constructed according to one embodiment of my invention and 9 the pinion which mates with this gear. Both gear and pinion are provided with longitudinally curved teeth designated at 10 and 11, respectively. The axis of the gear is indicated at 12 and 13 designates the axis of the pinion. 14 designates the root cone surface of the gear, 15 its pitch cone surface and 16 its top cone surface. The root cone surface of the pinion is designated at 17, its pitch cone surface at 18 and its top cone surface at 19. The teeth of the gears taper from end to end decreasing in depth from their outer to their inner ends. It is possible to proportion the gears of the pair according to this invention, as shown, so that root, pitch and top cone surfaces of both members intersect in a common apex 20 so that the teeth taper in depth from end to end in proportion to the taper of the gears themselves corresponding in this fashion to straight tooth bevel gears.

Figure 4:
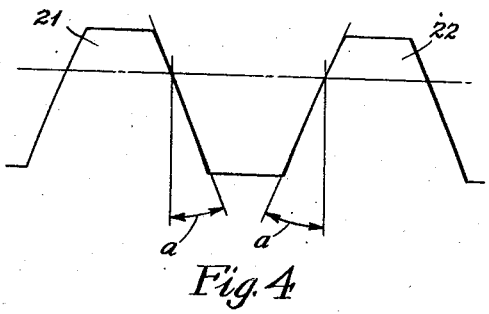
Figure 4 is a view showing diagrammatically an end elevation looking at the large ends of two of the teeth of the gear.
Figure 5:
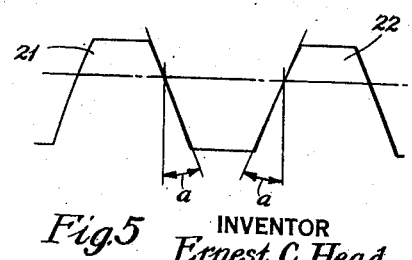
Figure 5 is a similar view looking at the small ends of the teeth.

End elevations of the large and small ends of two teeth 21 and 22 of the gear are shown diagrammatically in Figures 4 and 5, respectively. The pressure angles $a$ of the sides of the gear teeth are substantially the same at the large and small ends measured in the circumferential direction and the same for opposite sides of the teeth as shown. In this respect, also, curved tooth gears cut according to this invention resemble straight tooth bevel gears. The taper in height of the teeth from the large to the small end is clearly illustrated in these figures also. The same characteristic construction is to be found in the pinion which has, also, teeth tapering in height from their large to their small ends and of constant pressure angle measured circumferentially of the gears, pressure angles on opposite side faces of the teeth being equal in a circumferential direction. Due to this equality of pressure angles on opposite sides of the teeth, the teeth of both gear and pinion are symmetrical.

While the teeth of gears constructed according to this invention are of uniform pressure angles from end to end measured circumferentially of the gears, the pressure angles measured normal to the teeth vary.

Figure 3:
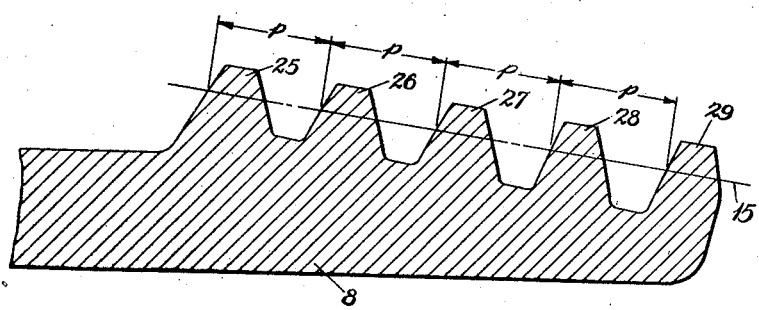
Figure 3 is a section through the gear or larger member of the pair on an enlarged scale taken along a line offset from the axis of the gear and extending diagonally of the face of the gear.

Figure 3 shows a section through the gear 8 constructed according to one embodiment of my invention taken on the line offset from the axis of the gear and extending diagonally of the teeth. The teeth are of uniform pitch in this section measured on the pitch surface 15 of the gear, the distances $p$ measured on the pitch surface being equal. In this section, however, the pressure angles of the teeth of course vary, the pressure angles of opposite sides of the tooth 25 being unequal to the pressure angles of the sides of any of the other teeth 26, 27, 28 and 29. In this section or in a normal section, the pressure angles increase continuously from the large to the small ends of the teeth, the pressure angles of the tooth at the inner end of the gear being larger, as shown, than the pressure angles of the tooth in this section at the outer end of the gear and this increase is continuous, the pressure angles of tooth 25 being greater than of tooth 26, and of tooth 26 greater than of tooth 27, etc. The gears are of uniform pressure angle only in the circumferential direction. Figure 3 shows clearly how the teeth taper in height from their outer to their inner ends and it shows clearly also how the present invention provides a tooth structure of increased strength since the teeth at their small ends are much stronger than any previous form of hobbed spiral bevel gear.

Figure 6:
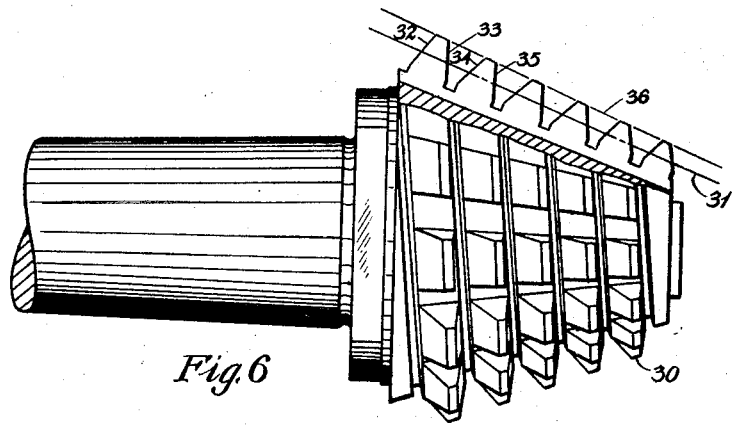
Figure 6 is a side elevation, partly in section, of a taper hob such as may be employed in cutting the gears shown.

For hobbing spiral bevel gears constructed according to this invention a taper hob such as described more particularly in my copending application, Serial No. 278,208, filed May 16, 1928 is preferably employed. This hob is shown in Figure 6 at 30. It is of constant pitch in axial section measured on the pitch surface 31 of the hob. The cutting edges of the hob are, however, of varying pressure angles from one end of the hob to the other. In the embodiment illustrated, the pressure angles of the cutting edges increase continuously from the large to the small end of the hob, the pressure angle of the cutting edge 32 being, for instance, greater than the pressure angle of the opposite side cutting edge 33 and the pressure angles of each of these side cutting edges being in turn less than the pressure angles of succeeding cutting edges 34, 35, etc. toward the small end of the hob. The cutting teeth of the hob are made to decrease in height toward the small end of the hob so as to cut teeth of tapering depth on the blank. This can be accomplished by turning off the top cone surface 36 of the hob to a smaller cone angle than the pitch cone surface 31. With this hob, as already pointed out, tapered gears having teeth of tapering depth and properly proportioned can be cut.

Figures 7, 8:
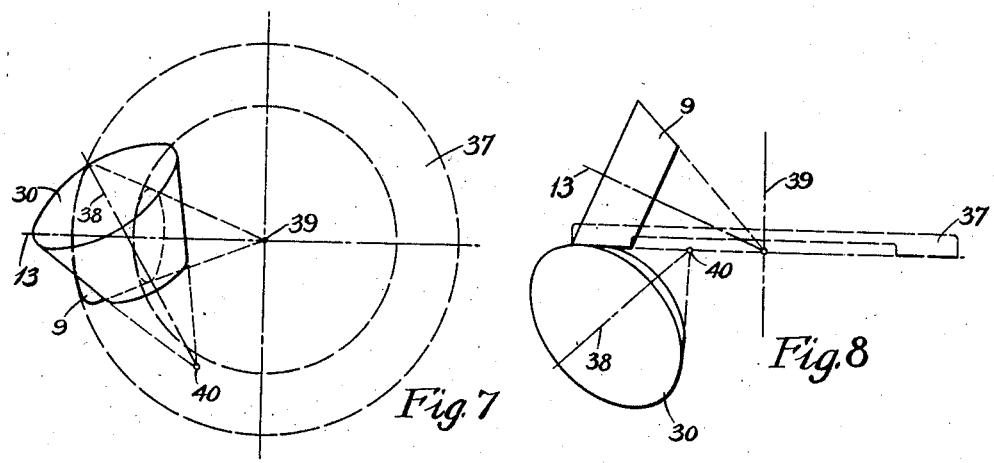
Figures 7 and 8 are a plan view and a side elevation, respectively, illustrating diagrammatically the preferred method of producing gears according to this invention.

In hobbing gears according to this invention, both members of the pair are preferably generated in a rolling operation. One method of effecting this process is illustrated in Figures 7 and 8 where the generation of one member of the pair, for instance the pinion 9 is illustrated. The hob 30 is so positioned relative to the blank as to represent a crown gear or other basic gear 37. The hob and gear blank are brought into tangential relation with the axis 38 of the hob offset from the axis 39 of the imaginary basic crown gear and extending diagonally of the face of this basic crown gear. The hob apex 40 may be positioned on a line perpendicular to the axes 38 and 13 of the hob and gear blank, respectively, as required when hobbing gears according to the process described in the patent of Nicola Trbojevich Reissue No. 16,173, issued September 22, 1925, or this hob apex 40 may be offset from this line as illustrated in the drawings. In generating the blank, the hob 30 and blank 9 are rotated continuously on their respective axes 38 and 13 in timed relation and simultaneously a continuous relative rolling movement is imparted between the hob and blank about the axis 39 of the basic generating gear. The teeth of the blank are completely generated after the hob has rolled once across the blank as in the usual method of hobbing spiral bevel gears in a generating operation. The same method may be employed in generating the gear 8 or larger member of the pair.

While I have described my invention particularly with reference to spiral bevel gears it will be understood that it can be applied to hypoid gears also and to tapered gears generally.

In general it may be said that while I have described certain particular embodiments of my invention, it will be understood that the invention is capable of various further modifications without departing from its scope and that this application is intended to cover any adaptations, uses, or embodiments following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. A tapered gear having longitudinally curved teeth, the side faces of which from end to end of the teeth are of substantially constant pressure angle measured circumferentially of the gear.

2. A tapered gear having longitudinally curved teeth which increase in height from their inner to their outer ends, the side faces of which from end to end of the teeth are of substantially constant pressure angle measured circumferentially of the gear.

3. A tapered gear having longitudinally curved teeth, the side tooth surfaces of which at the inner ends of the teeth have a pressure angle measured circumferentially of the gear equal at least to the pressure angle of said side surfaces at the larger ends of the teeth measured circumferentially of the gear.

4. A tapered gear having longitudinally curved teeth which increase in depth from the small to the large ends of the teeth and which measured on the pitch surface are of uniform pitch along a straight line offset from the axis of the gear.

5. A tapered gear having longitudinally curved teeth which increase in depth from the small to the large ends of the teeth and which measured on the pitch surface are of uniform pitch along a straight line offset from the axis of the gear, said teeth measured circumferentially of the gear being of substantially constant pressure angle from end to end.

6. A tapered gear having longitudinally curved teeth, the pressure angles of opposite side faces of which are equal from end to end of the teeth measured circumferentially of the gear.

ERNEST C. HEAD.